US006853962B2

(12) United States Patent
Appleby

(10) Patent No.: US 6,853,962 B2
(45) Date of Patent: Feb. 8, 2005

(54) TRAINING APPARATUS AND METHOD

(75) Inventor: Stephen C Appleby, Colchester (GB)

(73) Assignee: British Telecommunications public limited company, London (GB)

(*) Notice: Subject to any disclaimer, the term of this patent is extended or adjusted under 35 U.S.C. 154(b) by 147 days.

(21) Appl. No.: 09/051,070
(22) PCT Filed: Sep. 11, 1997
(86) PCT No.: PCT/GB97/02438
§ 371 (c)(1),
(2), (4) Date: Apr. 2, 1998
(87) PCT Pub. No.: WO98/11523
PCT Pub. Date: Mar. 19, 1998

(65) Prior Publication Data
US 2002/0059056 A1 May 16, 2002

(30) Foreign Application Priority Data
Sep. 13, 1996 (GB) .............................. 9619165

(51) Int. Cl.$^7$ ................................................ G10L 3/00
(52) U.S. Cl. .......................... 703/2; 704/256; 704/257
(58) Field of Search ............................... 703/2, 23, 26; 704/251, 255, 256, 257, 277, 246; 706/45, 24; 707/1, 3, 500, 530

(56) References Cited

U.S. PATENT DOCUMENTS

| | | | | |
|---|---|---|---|---|
| 5,510,981 A | * | 4/1996 | Berger et al. ........... 364/419.02 |
| 5,634,086 A | * | 5/1997 | Rtischev et al. ........... 395/2.79 |
| 5,636,325 A | * | 6/1997 | Farrett ....................... 395/2.67 |
| 5,642,519 A | * | 6/1997 | Martin .......................... 704/9 |
| 5,649,057 A | * | 7/1997 | Lee et al. .................. 395/2.65 |
| 5,652,897 A | * | 7/1997 | Linebarger et al. ......... 395/754 |
| 5,696,962 A | * | 12/1997 | Kupiec ....................... 395/604 |
| 5,717,828 A | * | 2/1998 | Rothenberg ............... 395/2.79 |
| 5,730,603 A | * | 3/1998 | Harless ....................... 434/308 |
| 5,748,841 A | * | 5/1998 | Morin et al. ............... 395/2.66 |
| 5,748,973 A | * | 5/1998 | Palmer et al. .............. 395/759 |
| 5,774,860 A | * | 6/1998 | Bayya et al. ............... 704/275 |
| 5,791,904 A | * | 8/1998 | Russell et al. ............. 434/185 |
| 5,797,123 A | * | 8/1998 | Chou et al. ................. 704/256 |
| 5,805,832 A | * | 9/1998 | Brown et al. .............. 395/752 |
| 5,809,493 A | * | 9/1998 | Ahamed et al. ............. 706/52 |
| 5,991,712 A | * | 11/1999 | Martin ......................... 704/9 |
| 6,044,347 A | * | 3/2000 | Abella et al. ............... 704/272 |
| 6,163,785 A | * | 12/2000 | Carbonell et al. .......... 707/530 |
| 6,182,062 B1 | * | 1/2001 | Fujisawa et al. ............. 707/3 |

OTHER PUBLICATIONS

Kawahara et al "Key Phase Detection and Verification for Flexible Speech Understanding," IEEE, 1996, pp. 861–864.*

* cited by examiner

Primary Examiner—Thai Phan
(74) Attorney, Agent, or Firm—Nixon & Vanderhve P.C.

(57) ABSTRACT

Training apparatus for training a user to engage in transactions (e.g. a foreign language conversation) with another person whom the apparatus is arranged to simulate, the apparatus comprising:

an input for receiving input dialogue from a user;

a lexical store containing data relating to individual words of said input dialogue;

a rule store containing rules specifying grammatically allowable relationships between words of said input dialogue;

a transaction store containing data relating to allowable transactions between said user and said person;

a processor arranged to process the input dialogue to recognise the occurrence therein of words contained in said lexical store in the relationships specified by the rules contained in said rule store in accordance with the data specified in the transaction store, and to generate output dialogue indicating when correct input dialogue has been recognised; and an output device for making the output dialogue available to the user.

28 Claims, 14 Drawing Sheets

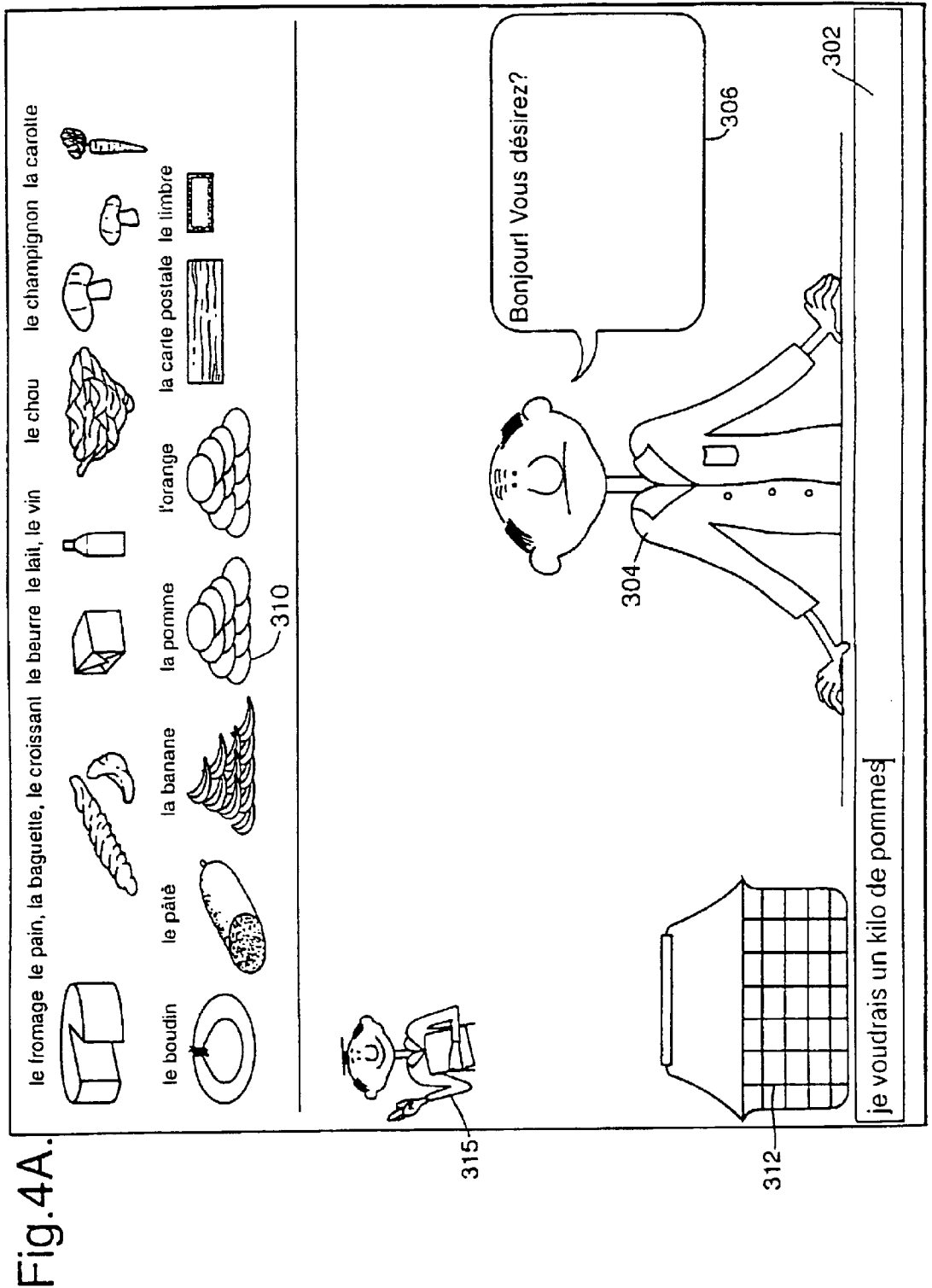

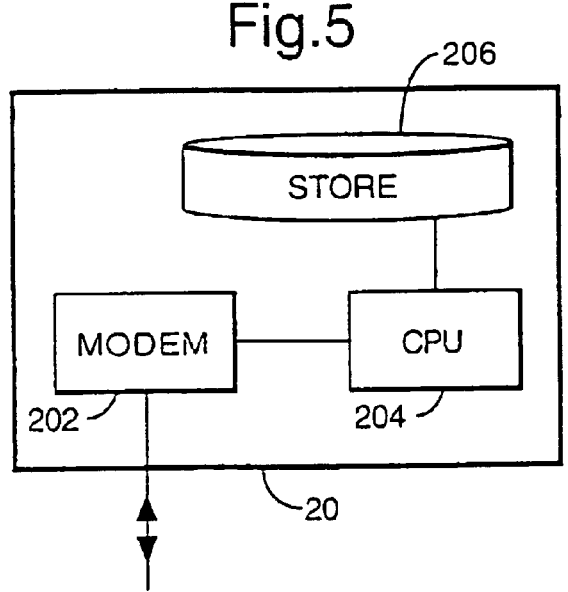
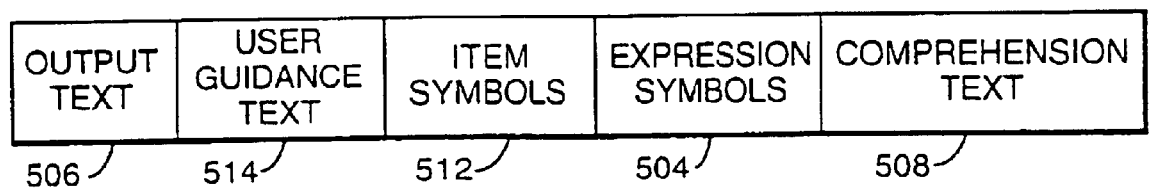

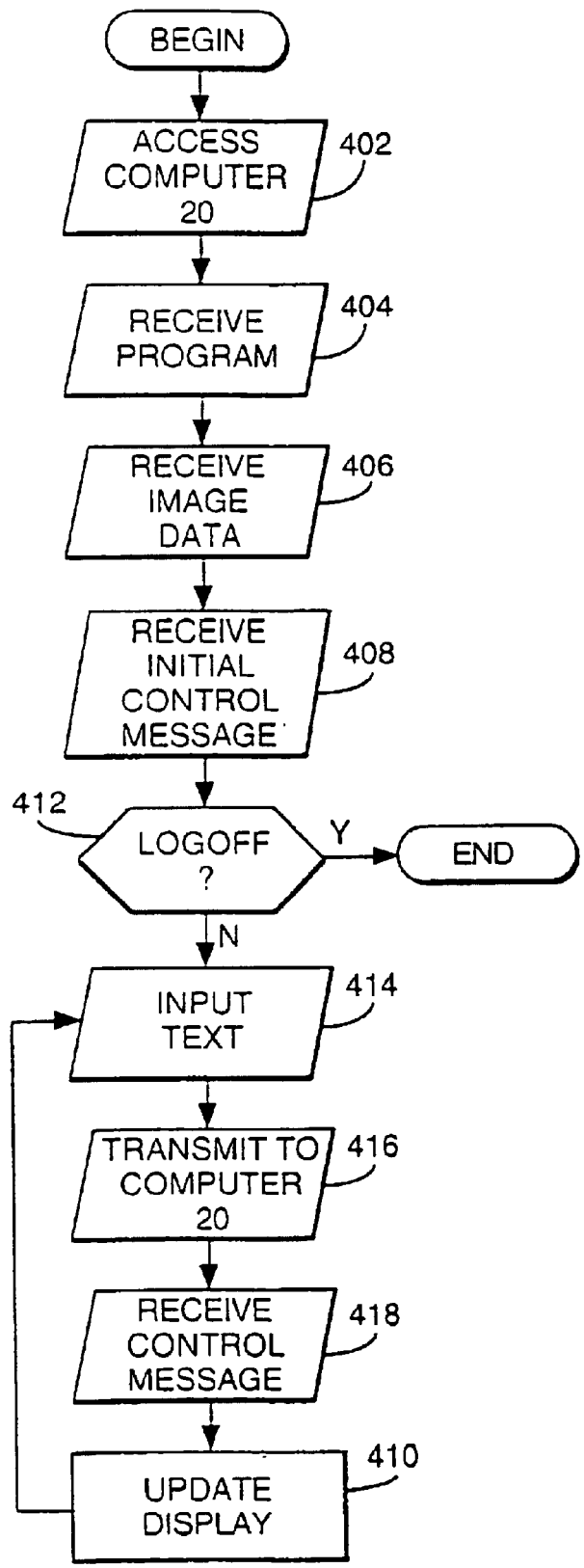

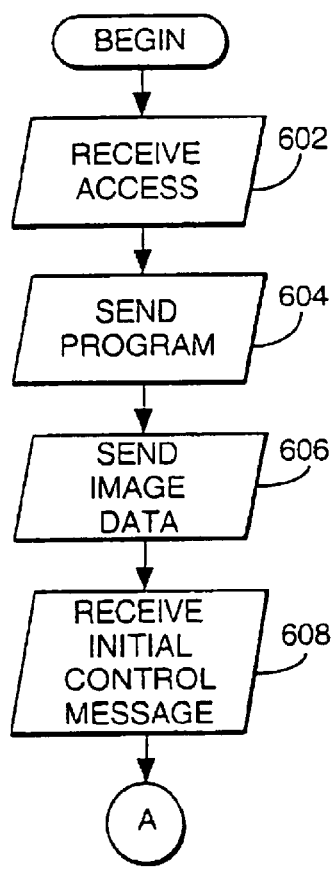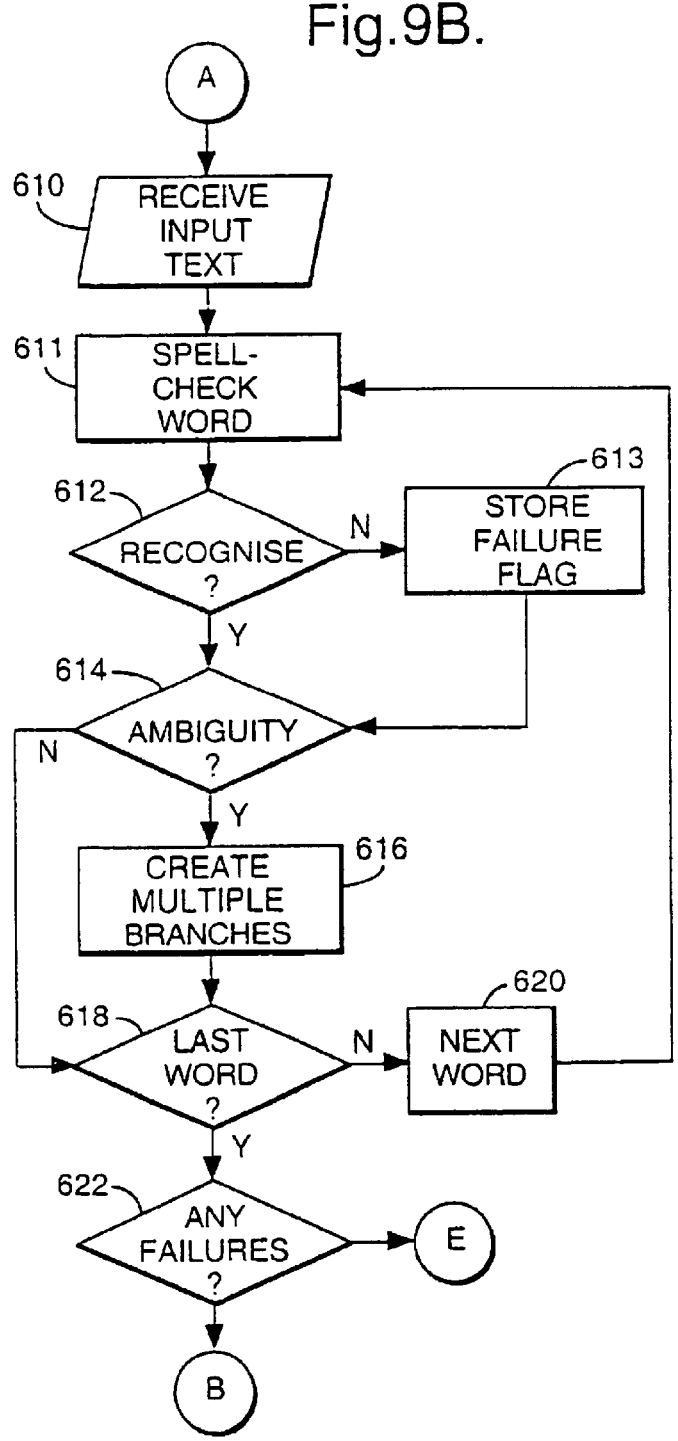

TRAINING APPARATUS AND METHOD

BACKGROUND OF THE INVENTION

1. Field of the invention

This invention relates to apparatus and methods for training; particularly, but not exclusively, for language training.

2. Description of Related Art

In language training, various different skills may be developed and tested. For example, our earlier application GB 2242772, discloses an automated pronunciation training system, in some respects improving upon the well known "language laboratory" automated test equipment.

Training and dialogue is carried out by human teachers who are experienced in the target language (i.e. the language to be learn). In such training, the teacher will understand what is being said, even when the grammar is imperfect, and can exercise judgment in indicating when a serious or trivial mistake is made, and in explaining what the correct form should be.

Ultimately, it may become possible to provide a computer which would duplicate the operation of such a language teacher, in properly comprehending the words of a student, carrying out a full dialogue, and indicating errors committed by the student. However, although the fields of artificial intelligence and machine understanding are advancing, they have not as yet reached this point.

EP-A-0665523 briefly discloses a foreign language skills maintenance system, in which role playing is permitted, comprising an input for receiving input dialogue from a user and an output at which the "correct" dialogue which would be anticipated from the user is displayed, for comparison with the input dialogue by the user (or by the computer).

An object of the present invention is to provide a training system (particularly for language training but possibly applicable more widely) which utilized limited volumes of memory to store limited numbers of words and grammatical data, but is nonetheless capable of recognizing input language errors and of carrying on a dialogue with a student.

SUMMARY OF THE INVENTION

In an embodiment, the present invention provides a display of a person, and is arranged to vary the display to have different expressions, corresponding to comprehension, and at least one degree of incomprehension. Preferably, two degrees of incomprehension are provided; one corresponding to an assumed error in an otherwise comprehensible input and the other corresponding to incomprehensible input.

In an embodiment, a display is provided which indicates target language responses generated by the invention, together with text (preferably in the target language) indicating the level of comprehension achieved. Thus, an error is indicated without interrupting the target language dialogue.

Preferably, in an embodiment, the invention provides for the generation of source language text for the guidance of the student. Preferably, the source language text is normally hidden and is displayed on command by the user.

Very preferably, the source language text comprises guidance as to what the last target language output text means.

Very preferably, the guidance text comprises an explanation of what any detected error is assumed to be.

Very preferably, the guidance text comprises text indicating what suitable next responses by the student might be.

Alternatively, the invention may comprise speech recognition means for the input of speech and/or speech synthesis means for the generation of speech, to replace input and/or output text in the above embodiments.

Preferably, the invention comprises a terminal for use by the student at which input is accepted and output is generated, and a remote computer at which the processing necessary to convert each input from the user to corresponding outputs is performed, the two being linked together by a telecommunications channel. This arrangement permits the processing resources required to be centralized, rather than requiring them to be present for each user (language student). It also provides for effective use of the telecommunications channel, since much of the traffic is relative low bandwidth text information.

Preferably, in this embodiment, the telecommunications channel comprises the network of high bandwidth links interconnecting computer sites known as the "Internet". Where this is the case, the invention may conveniently be realized as a mobile program ("applet") which is downloaded initially, and operates with conventional resident communications programs referred to as "HTML browsers".

In an embodiment, the invention operates by reference to data relating to words, and data relating to grammatical rules.

This enables a far greater range of input and output dialogue, for the same memory usage, than direct recognition and/or generation of dialogue phrases.

The presence of errors may be detected by providing a first set of rules which are grammatically correct, and associated with each of the first set, a respective second set of rules each of which relaxes a constraint of the respective first rule to which it relates. Input text is then parsed by using rules of the first set and, at least where this is unsuccessful, rules of the second sets; where text is successfully parsed by a rule of the second set but not by the first set rule to which that second set relates, the error determined to be present is that corresponding to the constraint which was relaxed in the rule of the second set.

BRIEF DESCRIPTION OF THE DRAWINGS only, with reference to the accompanying drawings in which:

FIGS. 4a–4d are exemplary displays shown on the display of FIG. 3;

FIG. 5 is a block diagram showing schematically the structure of a host computer forming part of FIG. 1;

FIG. 6 is a flow diagram showing schematically the general process performed by the user interface terminal of FIG. 2;

FIG. 7 illustrates the structure of a control message transmitted from the host computer of FIG. 5 to the user interface terminal of FIG. 2;

DESCRIPTION OF THE PREFERRED EMBODIMENTS

Figure 1:
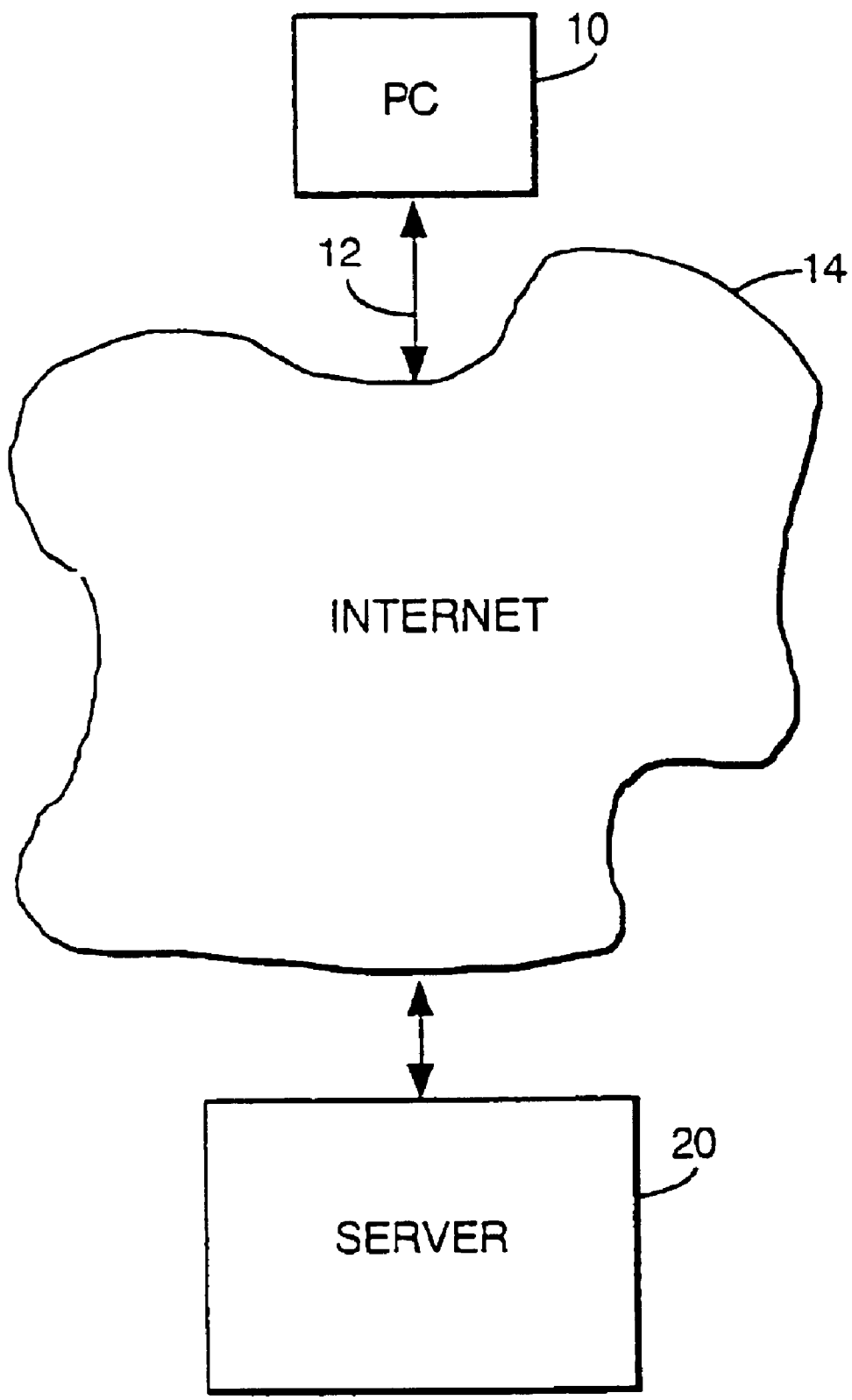
FIG. 1 is a block diagram showing schematically the apparatus of an embodiment of the invention.

Referring to FIG. 1, the system of a first embodiment of the invention comprises a terminal 10 such as a personal computer connected, via a telecommunications link 12 such as a telephone line, to a telecommunications network 14 such as the Internet, which in turn is connected to a host computer 20. Both the terminal 10 and the host computer 20 are conveniently arranged to communicate in a common file transfer protocol such as TCP/IP.

Figure 2:
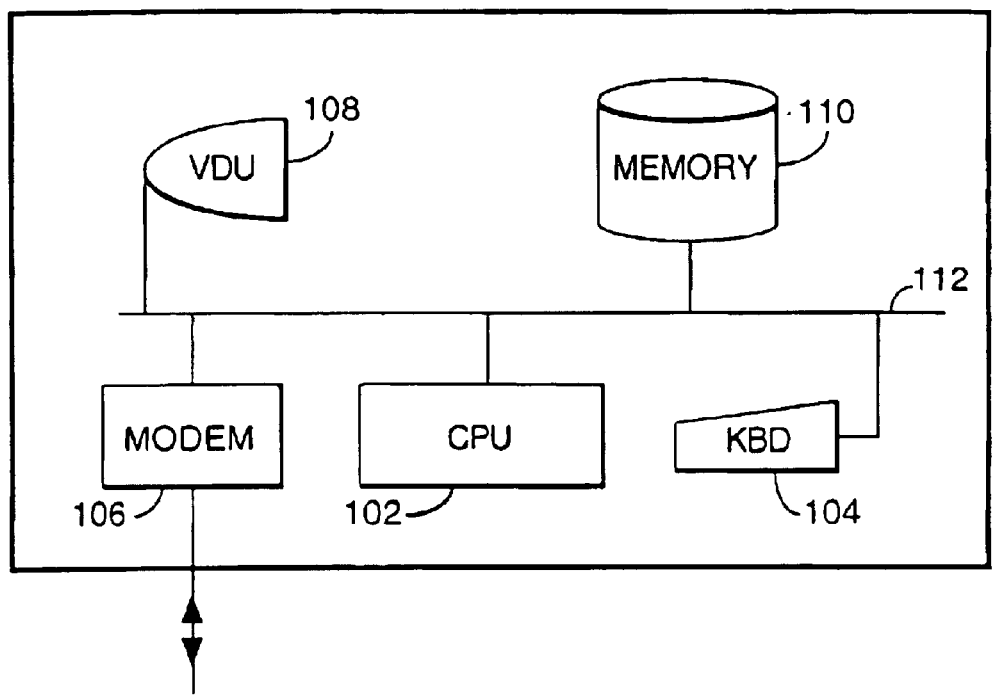
FIG. 2 is a block diagram showing in greater detail the structure of a user interface terminal forming part of FIG. 1.

Referring to FIG. 2, the terminal 10 comprises a central processing unit 102, a keyboard 104, a modem 106 for communication with the telecommunications link 12, a display device 108 such as a CRT, and a store 110, schematically indicated as a single unit but comprising read only memory, random access memory, and mass storage such as a hard disk. These are interconnected via a bus structure 112.

Figure 3:
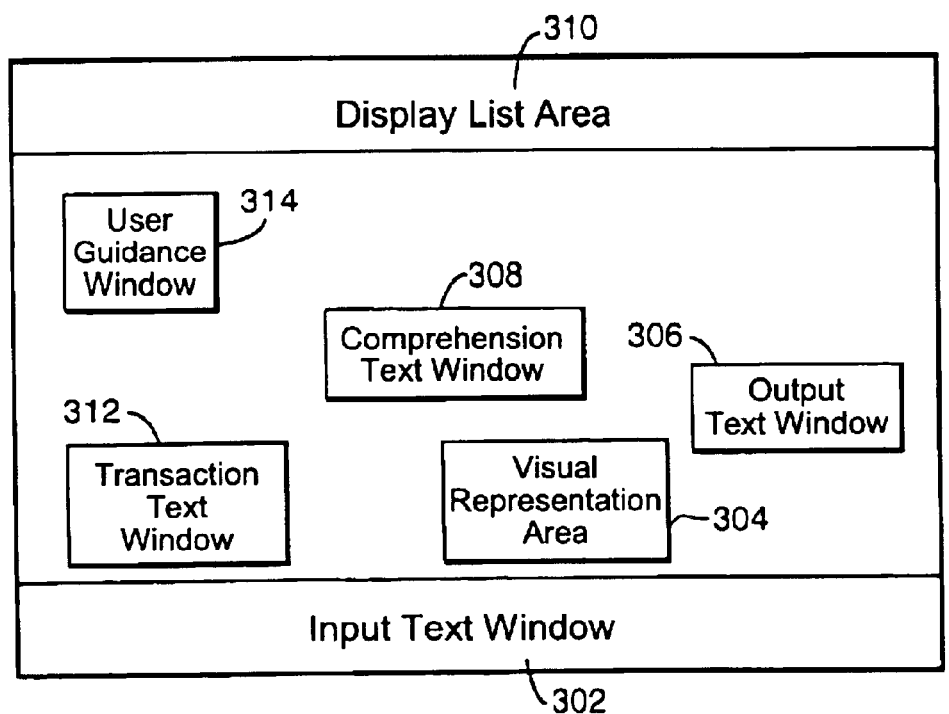
FIG. 3 is an illustrative diagram of the display shown on a display device forming part of the terminal of FIG. 2.

Within the store 110 is a frame buffer area, to which pixels of the display device 108 are memory mapped. The contents of the frame buffer comprise a number of different window areas when displayed on the display device 108, as shown in FIG. 3; namely, an area 302 defining an input text window; an area 304 carrying a visual representation of a person; an area 306 defining an output text window; an area 308 defining a comprehension text window; an area 310 displaying a list of possible items; an area 312 defining a transaction result window; and an area 314 defining a user guidance window. The CPU 102 is arranged selectively to hide the response guidance window 314, and to display an icon 315, the response guidance window being displayed only when the icon 315 is selected via the keyboard or other input device.

FIG. 4a illustrates the appearance of the display device 108 in use; the response guidance display area 314 is hidden, and icon 315 is displayed.

Also stored within the store 110 are a set of item image data files, represented in a standardized format such as for example a .GIF or .PIC format, each being sized to be displayed within the transaction result area 312, and a set of expression image data files defining different expressions of the character displayed in the person area 304. Finally, data defining a background image is also stored.

Referring to FIG. 5, the host computer 20 comprises a communications port 202 connected (e.g. a via an ISDN link) to the internet 12; a central processing unit 204; and a store 206. Typically, the host computer 20 is a mainframe computer, and the store comprises a large scale off line storage system (such as a RAID disk system) and random access memory.

Control and Communications

The terminal 10 and host computer 20 may operate under conventional control and communications programs. In particular, in this embodiment the terminal 10 may operate under the control of a GUI such as Windows (TM) and a Worldwide Web browser such as Netscape (TM) Navigator (TM) which is capable of receiving and running programs ("Applets") received from the Internet 12. The host computer 20 may operate under the control of an operating system such as Unix (TM) running a Worldwide Web server program (e.g. httpd). In view of the wide availability of such operating programs, further details are unnecessary here.

General Overview of System Behavior

In this embodiment, the scenario used to assist in language training is that of the grocer's shop selling a variety of foods.

The object of the present embodiment is to address input text in the target language to the grocer. If the text can be understood as an instruction to supply a type of item, this will be confirmed with visual feedback of several types; firstly, a positive expression will be displayed on the face of the grocer (area 304); secondly, the requested item will appear in the grocery basket transaction area (area 312) displayed on the screen 108; and thirdly the instruction will be confirmed by output text in the target language from the grocer (area 306).

If the input text can be understood as an instruction to purchase an item, but contains recognized spelling or grammatical errors, visual feedback of the transaction is given in the form of a confirmation of what the understood transaction should be as output text, and the display of the item in the grocery basket (area 312).

However, the existence of the error is indicated by the selection of a negative displayed expression on the face of the grocer (area 304), and a general indication as to the nature of the error is given by displaying text in the target language in a window indicating the grocer's thoughts (area 308).

This may be sufficient, taken with the user's own knowledge, to indicate to the user what the error is; if not, the user may select further assistance, in which case user guidance text indicating in more detail, in the source language, what the error is thought to be is displayed.

If the input text cannot be understood because one or more words (after spell correction) cannot be recognized, a negative expression is displayed in the face of the grocer (area 304) and output text in the target language is generated in the area 306 to question the unrecognized words.

If the words in the input text were all recognized but the text itself cannot be recognized for some other reason, then a negative expression is generated on the face of the grocer (304) and output text in the target language is generated in area 306 recording a failure to understand.

Figure 4B:
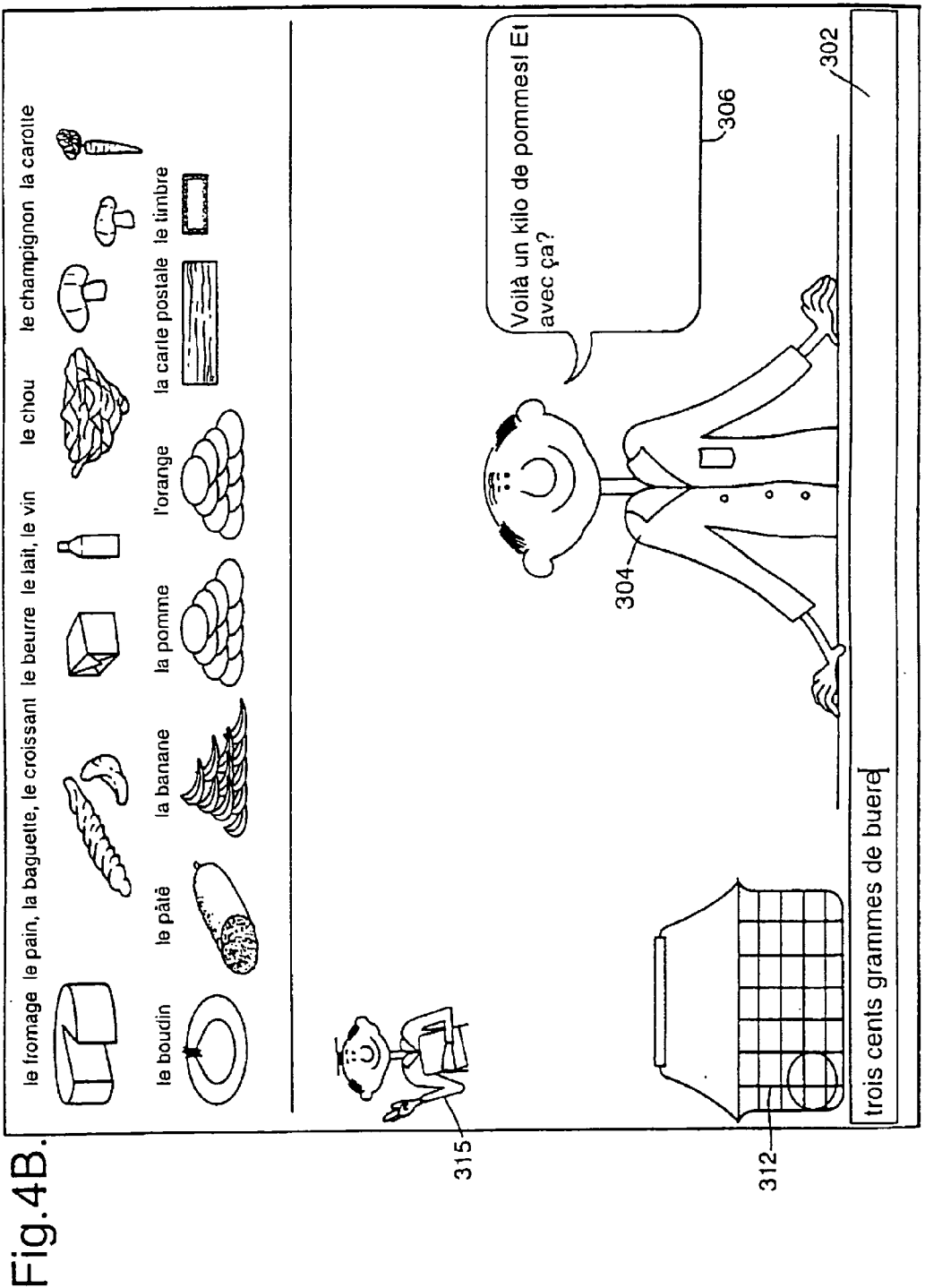
Figure 4C:
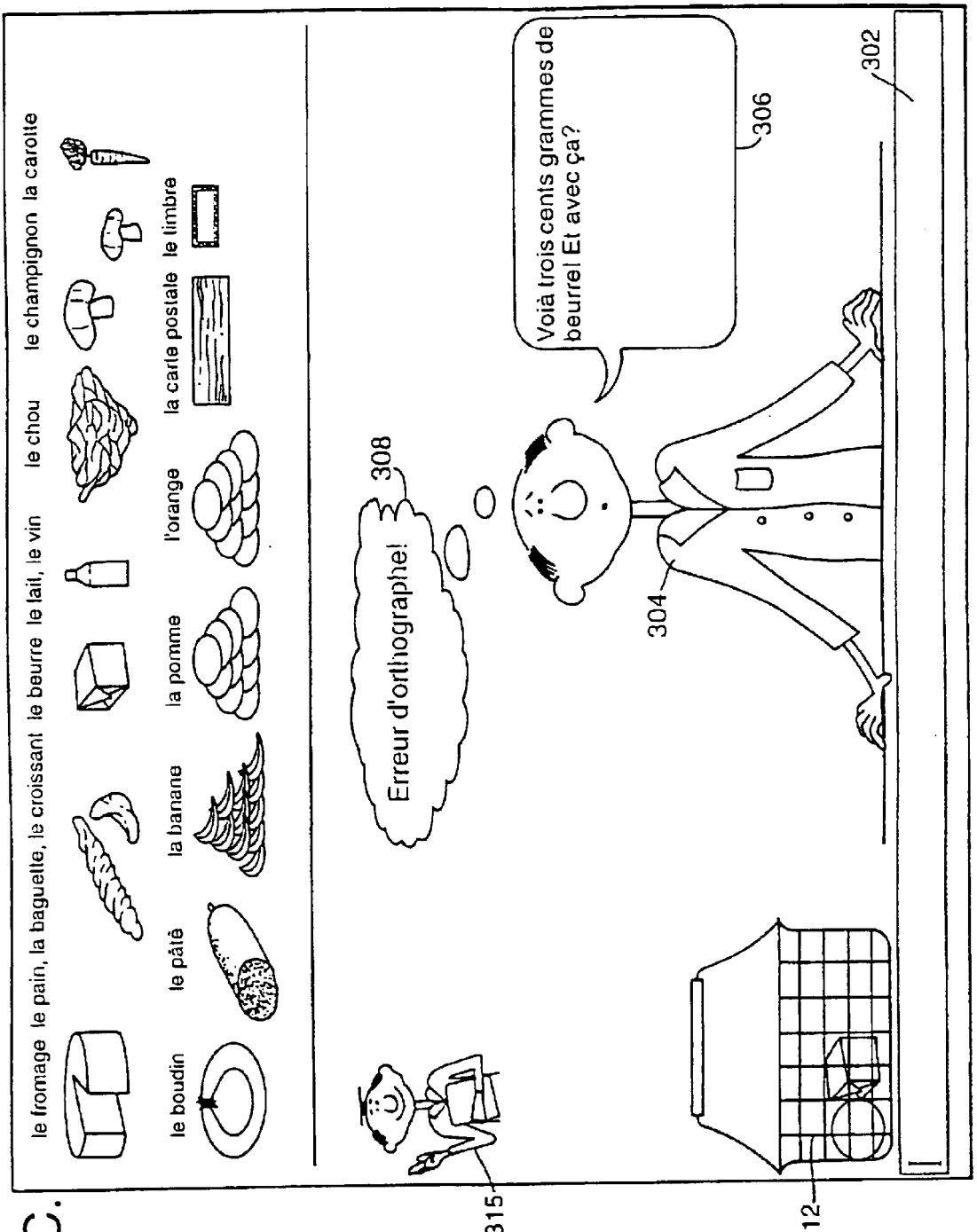

In such cases of complete lack of comprehension, a facial expression differing from the partial incomprehension shown in FIG. 4c is selected for display.

Operation of Terminal 10

Referring to FIG. 6, to initiate use of the system, the user sets up a connection to the host computer 20 from the terminal 10 (step 402). In step 404, a program (applet) for controlling the display of the image data is downloaded.

The host computer 20 then downloads a file of data representing the background image, a plurality of files of data representing the different possible expressions of the grocer, and a plurality of files of data representing all the items on sale, in step 406.

In step 408, initial control data is received from the computer 20, in the form of a control data message 500 which, as shown in FIG. 7, comprises a target language output text string 506, corresponding to words to be spoken by the grocer and hence to be displayed in the display area 306; a source language user guidance text string 514 to be displayed in the user guidance display area 314 if this is selected for display by the user; one or more item symbols 512 which will cause the selection for display of the images of one or more items in the display area 312; an expression symbol 504 for selecting one of the downloaded expression image files for display on the face of the grocer in the display area 304; and a target language comprehension text string 508 for display in the display area 308 to indicate what the grocer would understand by target language text input by a user as described below.

In the initial message transmitted in step 408, the item symbol field 512 and comprehension text field 508 are both empty.

In step 410, the CPU 102, under control of the program downloaded in step 404, first loads the background image to the frame store within the storage unit 110, and then overwrites the areas 304, 306, and, where applicable, 312 and 314; by generating image data representing the text strings and inserting it in the relevant windows 306, 308, 314; by selecting the facial expression image indicated by the expression symbol 504 and displaying this in the upper area of the person display area 304; and by selecting an item image indicated by the item symbol and displaying these in the area 312.

With the exception of the window 302 (which would at this stage be empty), the appearance of the display unit 108 at this stage is as shown in FIG. 4a.

Thus, the background display consists of the display of all the item images in the display area 310 together with a corresponding text label indicating, in each case, the item name; the display of the icon 315 indicating tutorial assistance; the display of the figure of a grocer with one of the selected expressions; the display of a speech bubble containing the grocer's speech output 306; and the display of a basket 312 receiving items placed therein by the grocer in response to shopping instructions.

If, in step 412, an instruction to log off or exit is input by the user, the process terminates. Otherwise, the CPU 102 scans the keyboard 104 (step 414) for the input of a string of text terminated by a carriage return or other suitable character, which is displayed in the input text display area 302 and, when input is complete, transmitted to the computer 20 in step 416 via the modem and Internet 12.

In response to the transmission of input text in step 416, the computer 20 returns another control message 500 (received in step 418) and, in response thereto, the terminal returns 10 to step 410 to update the display to reflect the contents of the control message.

Thus, referring to FIG. 4b, the result of the input of the text string shown in area 302 of FIG. 4a is to cause the display of the text message "Voila un kilo de pommes! Et avec ca?" in the output text area 306 (this representing the contents of the field 506 of the received control message).

Field 504 contains a symbol corresponding to a cheerful or positive expression, and the corresponding bit map image is displayed in the upper portion of field 304.

Field 512 contains a symbol indicating the appearance of an apple and accordingly this symbol is displayed in display area 312. No data is contained in the comprehension text field 508. Data is contained in the user guidance text field 514 but not displayed since the user has not selected the icon 315.

If, at this stage, the text input in step 414 is as displayed in the field 302 of FIG. 4b (which contains the words "Trois cents grammes de beure"), the control data received in step 418 leads to the display indicated in FIG. 4c.

In this case, the target language text indicated in the field 306 ("Voila trois cents grammes de beurre! Et avec ca?") indicates what the correct word is presumed to be, but the comprehension text field 508 of the received control message contains the target language text, displayed in field 308, "Erreur d'orthographe! " in a "thinks bubble" representation to indicate the thoughts of the grocer.

The expression symbol field 504 contains a symbol causing the display to a puzzled expression on the face of the grocer as shown in field 304. Since the transaction has been understood, the item (butter) is represented by a. symbol in the item symbol field 512 and displayed in the area 312.

Figure 4D:
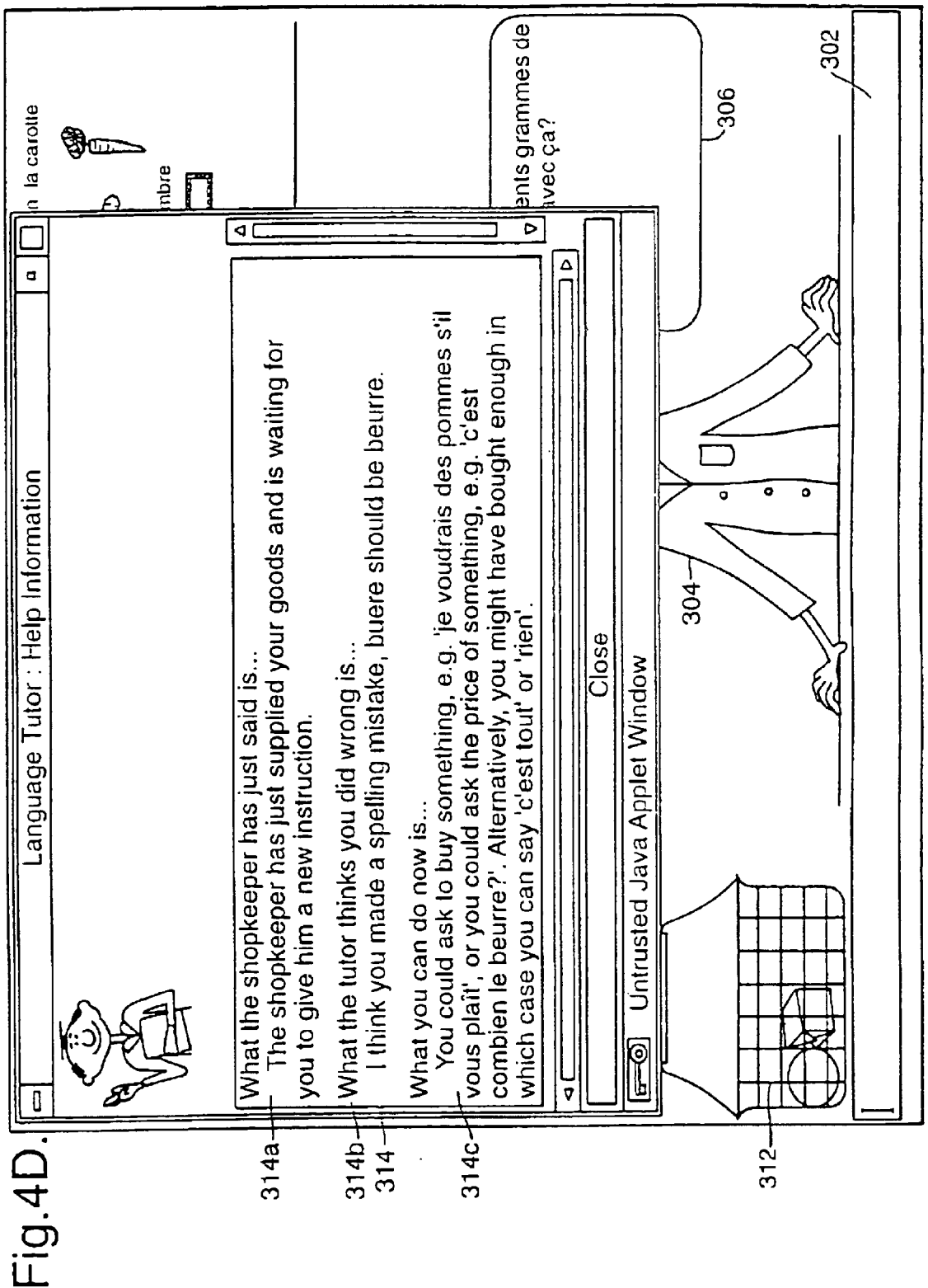

If, at this stage, the user selects the icon 315 (e.g. by a combination of key strokes or by the user of a pointing device such as a mouse) the contents of the user guidance (source language) text field 514 are displayed in the display area 314 which is overlaid over the background display as shown in FIG. 4d. In this embodiment, the guidance text contains three text fields; a first field 314a indicating generally, in the source language (e.g. English), what the words in the field 306 mean; an error analysis display 314b indicating, in the source language (e.g. English), the meaning of the words in the comprehension text field 308 and indicating what, in this case, the spelling error is assumed to be; and an option field 314c containing text listing the options for user input in response to the situation.

From the foregoing, the operation of the terminal 10 will therefore be understood to consist of uploading input text to the computer 20; and downloading and acting upon control messages in response thereto from the computer 20.

Action of the Host Computer 20

The host computer 20 will be understood to be performing the following functions:

1. Scanning the input text to determine whether it relates to one of the transactions (e.g., in this case, sale of one of a number of different items) in a predetermined stored list.

2. Determining whether all the information necessary for that transaction is complete. If so, causing the returned control message to display visual indications that this is the case. If not, causing the returned control message to include output text corresponding to a target language question designed to elucidate the missing information.

3. Spell checking and parsing the input text for apparent errors of spelling or grammar, and causing the returned control message to include the indicated errors.

4. Generating the user guidance text indicating, in the source language, useful information about the target language dialogue.

Because the number of transactions to be detected is relatively small in number, the computer 20 does not need to "understand" a large number of possible different input text strings or their meanings; provided the input text can be reliably associated with one of the expected transactions, it is necessary only to confirm whether all input words are correctly spelled and conform to an acceptable word order, without needing to know in detail the nuances of meaning that input text may contain.

However, the use of a set of grammar rules and a vocabulary database in the embodiment, as discussed in greater detail below, enables the computer 20 to comprehend a much wider range of input texts than prior art tutoring systems which are arranged to recognized predetermined phrases.

Figure 8:
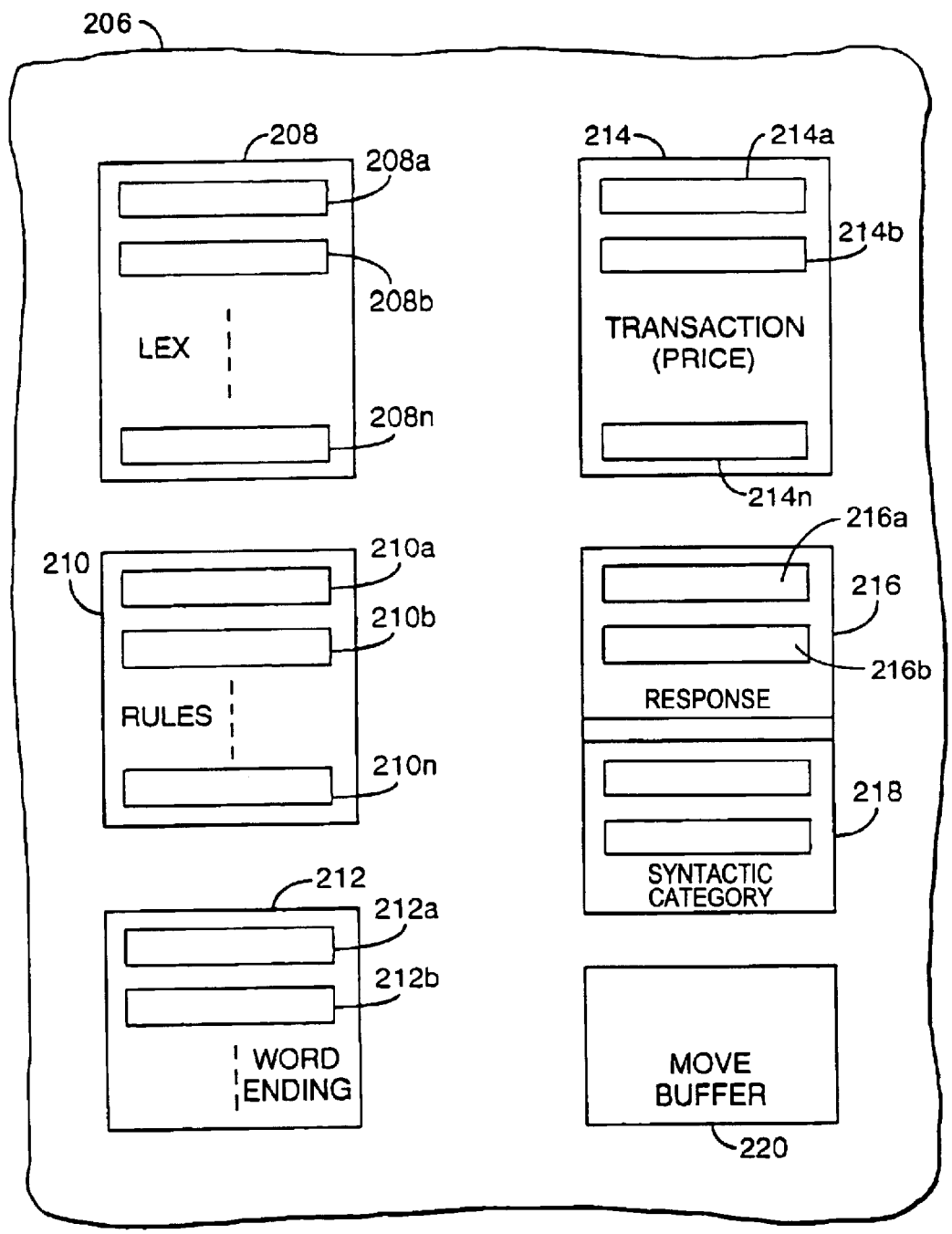
FIG. 8 is a diagram showing schematically the contents of a store forming part of the host computer of FIG. 5.

Referring to FIG. 8, the store 206 contains the following data:

a lexical database 208 comprising a plurality of word records 208a, 208b . . . 208n each comprising:

the word itself, in the target language;

the syntactic category of the word (e.g. whether it is a noun, a pronoun, a verb etc);

the values for a number of standard features of the word (specifically, the gender of the word, for example);

information (a symbol) relating to the meaning of the word; for example, where the word is a noun or verb, the symbol may be its translation in the source language or where the word is another part of speech such as an article, data indicating whether it is the definite or indefinite article and whether it is singular or plural.

Also comprised within the store 206 is a rule database 210 comprising a plurality (e.g. 44 in this embodiment) of rules 210a, 210b . . . 210n each specifying a rule of syntax structure of the target language and associated with a particular syntactic category. For example, the rule for a noun phrase will specify that it must comprise a noun and the associated article, whereas the rule for a verb phrase specifies that it must include a verb and its associated complement(s), and may include a subject, with which the form of the verb must agree, and which may (together with the object of the verb) be one of several different syntactic categories (e.g. a noun, a noun phrase, a pronoun and so on).

In general, rules will specify which types of words (or clauses) must be present in which order, and with what agreements of form, for a given semantic structure (e.g. a question).

In many target languages (for example French) agreement between the form of words is necessary. Thus, where a noun or a pronoun has an associated gender, then other parts of speech such as the definite or indefinite article, or the verb, associated with that noun or pronoun must have the same gender.

Likewise, where a noun or pronoun is associated with a number (indicating whether it is singular or plural) then the associated definite or indefinite article and/or verb must be singular or plural in agreement.

Other types of agreement may also be necessary, for example, to ensure that a word is in the correct case or tense. The need for such agreements is recorded in the relevant rules in the rules database.

A suitable semantic representation for the rules and words stored for use in the above embodiments may be found in "Translation using minimal recursion semantics" by A. Coopstake, D. Flickinger, R. Malouf, S. Riehemann, and I. Sag, to appear in proceedings of the 6th International Conference on Theoretical and Methodological Issues in Machine Translation (LEUVEN), currently available via the Internet at http://hpsg.stanford.edu/hpsg/papers.html.

In order to detect simple errors, in this embodiment the rules stored in the rules database 210 comprise, for at least some of the rules, a first rule which specifies those agreements (for example of gender and number) which are grammatically necessary for the corresponding syntactic structure to be correct, but also a plurality of relaxed versions of the same rule, in each of which one or more of the agreement constraints is relaxed.

In other words, for a first rule 210a which specifies correct agreement of both gender and number, there are associated relaxed rules 210b and 210c, the first of which (210b) corresponds but lacks the requirement for agreement of gender, and the second of which corresponds but lacks the requirement for agreement of number.

Conveniently, the relaxed rules are stored following the correct rules with which they are associated.

Rather than permanently storing all inflections of each word in separate word records 208 or storing all versions of the same word within its word record 208, conveniently an inflection table 212 is provided consisting of a plurality of inflection records, each consisting of a word stem and, for each of a predetermined plurality of different inflecting circumstances (such as cases, tenses and so on), the changes to the word endings of the stem.

Because many words exhibit identical inflection behaviour, the number of records 212a, 212b in the inflection table 212 is significantly smaller than the number of lexical records 208a . . . 208n in the lexical database 208. Each record in the lexical database 208 contains a pointer to one of the records in the inflection table 212, and the relationship is usually many to one (that is, several words reference the same inflection model record in the inflection table 212).

Before each use, or period of use, of the host computer 20 the CPU 204 reads the lexical records 208, and expands the lexical records table 208 to included a new record for each inflected version of the word, using the inflection table 212.

After operation of the present invention ceases, the CPU 204 correspondingly deletes all such additional entries. Thus, in periods when the invention is not in use, memory capacity within the computer 20 is conserved.

Prior to expansion, the lexical table 208 in this embodiment contains 265 records.

Specific information about the transactions making up the grocer shop scenario is stored in a transaction table 214 consisting of a number of entries 214a, 214b . . . 214n.

The entries include information defining the items (e.g. apples) as being goods for sale, and defining units of measurement (e.g. kilos), and relating each kind of item to the units of measure in which it is sold and the price per unit. Data is also stored associating each item with the item symbol and the graphics data representing the item (to be initially transmitted to the terminal 10).

A response table 216 consists of a plurality of entries 216a, 216b . . . each corresponding to one type of output control message 500 generated by the computer 20, and storing, for that output, the anticipated types of response, ranked in decreasing order of likelihood.

For example, the likely responses to the opening message "Vous désirez?" are, firstly, an attempt to buy produce; secondly, an attempt to enquire about produce (for example to ask the price).

On the other hand, the responses to the output "Et avec ca?" which follows a completed purchase include the above and additionally the possibility of the end of the session, in which case a statement indicating that nothing more is sought is expected.

Likewise, if the last response was to supply price information, the next response could be an attempt to complete a transaction for the subject of the inquiry, or could be a different enquiry, or an attempt to purchase something different, or an instruction to end the session.

Each entry in the response table also includes the associated source language response assistance text displayed in the text areas 314a and 314c.

Each of the possible responses in the response table 216 contains a pointer to an entry in a syntactic category table 218, indicating what syntactic category the response from the user is likely to fall into; for example, if the last output text displayed in the text area 306 asks "How many would you like?", the answer could be a sentence including a verb ("I would like three kilos please") or a noun phrase ("Three kilos").

Finally, a buffer 220 of most recent system outputs is stored, storing the last, or the last few (e.g. two or three), system outputs as high level semantic structures. By reference to the system output buffer, it is therefore possible to determine to what the text input by the user is an attempt to respond and hence, using the response table 216, to assess the likeliest types of response, and (by reference to the syntactic categories table 218) the likely syntactic form in which the anticipated responses will expressed.

Operation of the Host Computer 20

Referring to FIG. 9, the operation of the host computer in this embodiment will now be described in greater detail.

Referring to FIG. 9a, in step 602, an attempt by a terminal 10 to access the computer 20 is detected.

In step 604, the CPU 204 accesses the stored file within the store 206 storing the program to be downloaded and transmits the file (e.g. in the form of an Applet, for example in the Java (TM) programming language) to the terminal 10.

In step 606, the CPU 204 reads the transaction data table 214 and transmits, from each item record, the item image data file and the item type symbol.

The initial control message 500 sent in step 608 is predetermined, and consists of the data shown in FIG. 4a (and described above in relation thereto) together with the stored text for display, if required, in the fields 314a and 314c which is stored in the response table 216 in the entry relating to this opening system output.

Referring to FIG. 9b, in step 610, the host computer 20 awaits a text input from the terminal 10. On receipt, in step 611, if the language permits contractions such as "l'orange", the contraction is expanded as a first step. Then, each word is compared with all the lexical entries in the table 208. Any word not present in these tables is assumed to be a mis-spelling which may correspond to one or more valid words; if a mis-spelling exists which could correspond to more than one valid word (step 614) then a node is created in the input text prior to the mis-spelling and each possible corresponding valid word is recorded as a new branch in the input text in place of the mis-spelled word (step 616).

If the word is not recognized even after spell correction (step 612) the word is retained and an indication of failure to recognize it is stored (step 613).

This process is repeated (step 620) until the end of the input text is reached (step 618).

If (step 622) any words were not recognized in steps 612, it will be necessary to generate an output text indicating missing words and accordingly the process of 204 proceeds to FIG. 9f (discussed below). Otherwise, at this stage, the input text consists entirely of words found in the table 208, several of which may appear in several alternative versions where a spelling error was detected, so as to define, in such cases, a stored lattice of words branching before each such mis-spelling into two or more alternative word paths.

The or each mis-spelling is stored prior to its replacement.

Figure 9C:
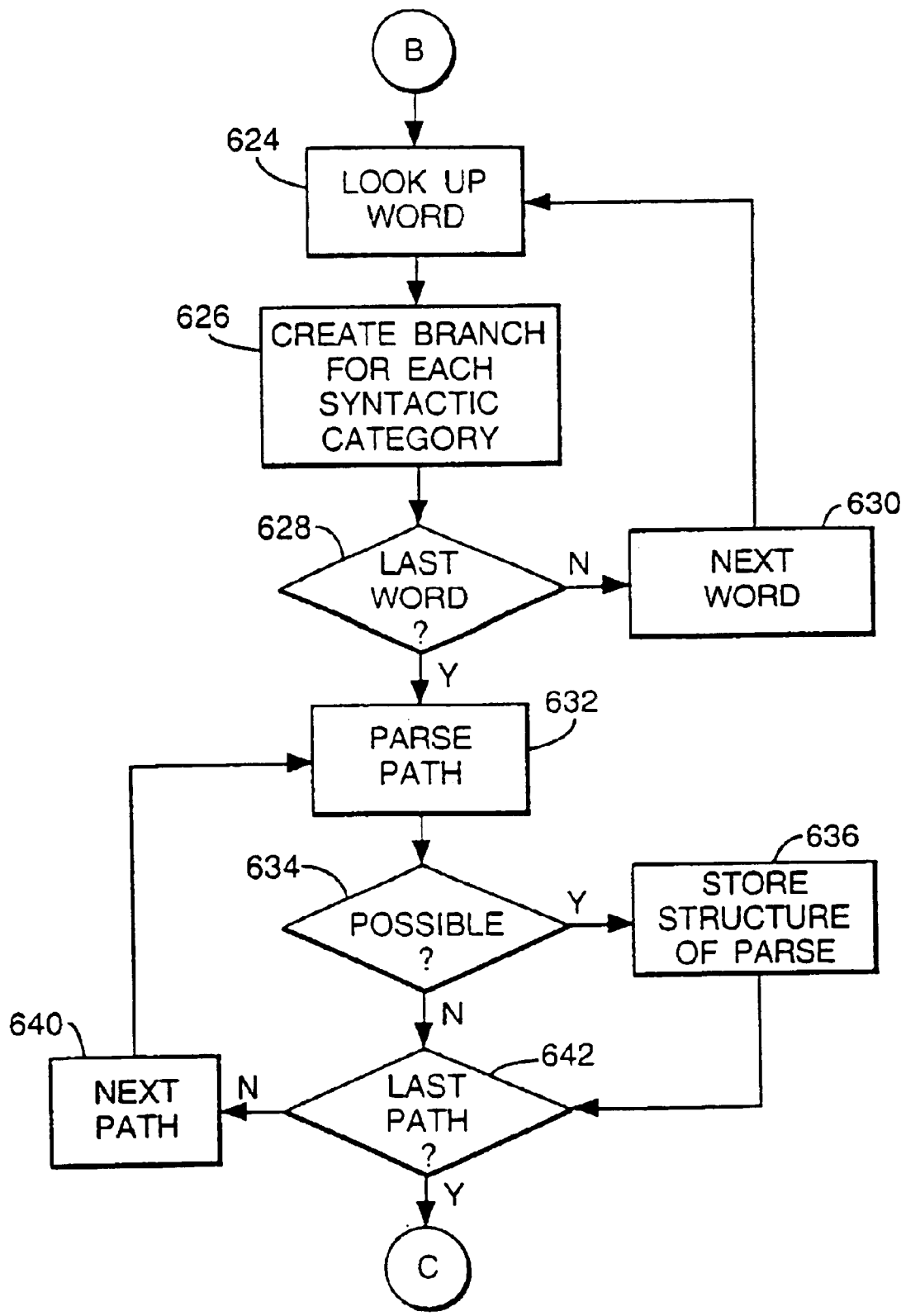
FIG. 9 (comprising FIGS. 9a–9f) is a flow diagram showing schematically the process of operation of the host computer of FIG. 5.
Figure 9D:
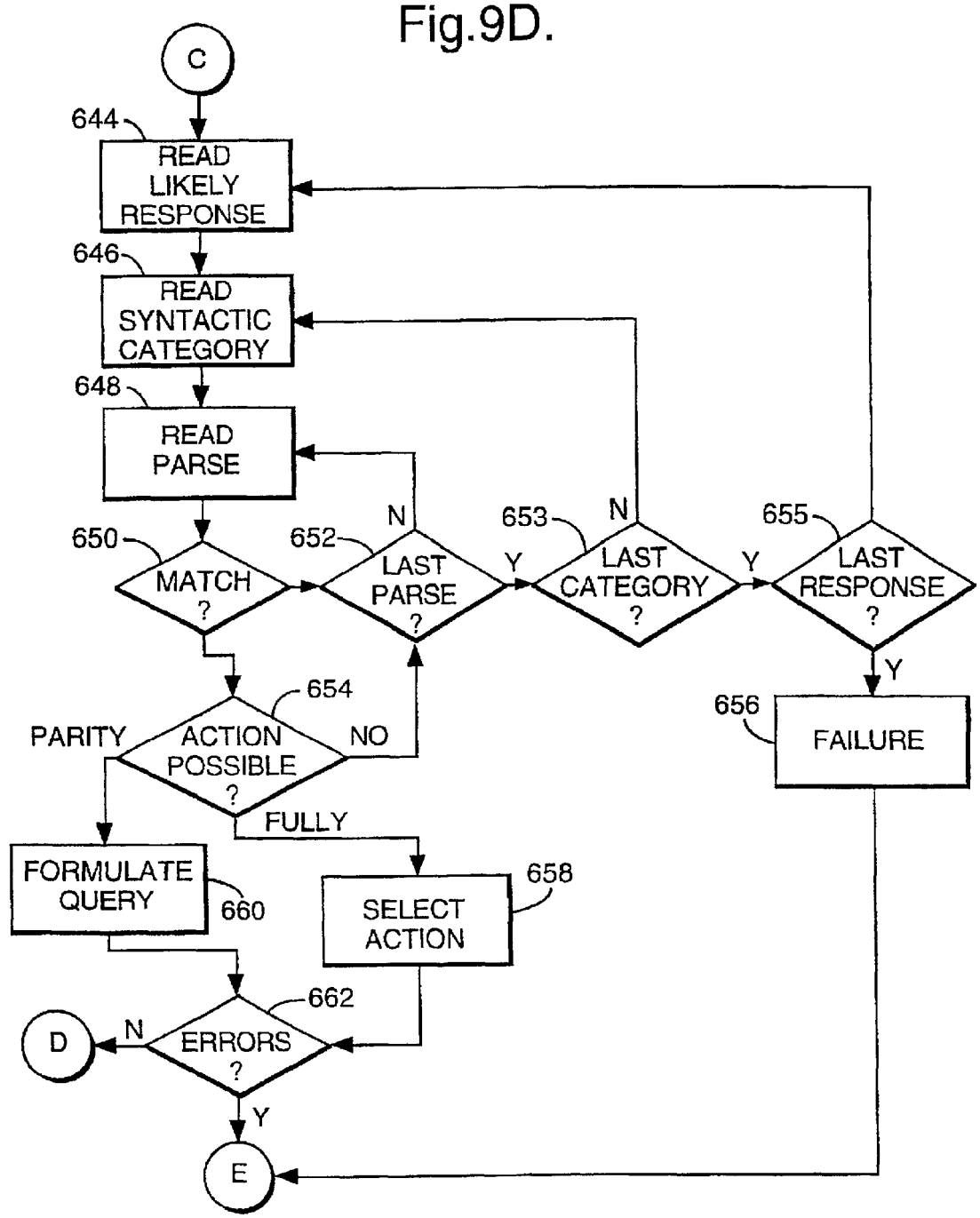
Figure 9E:
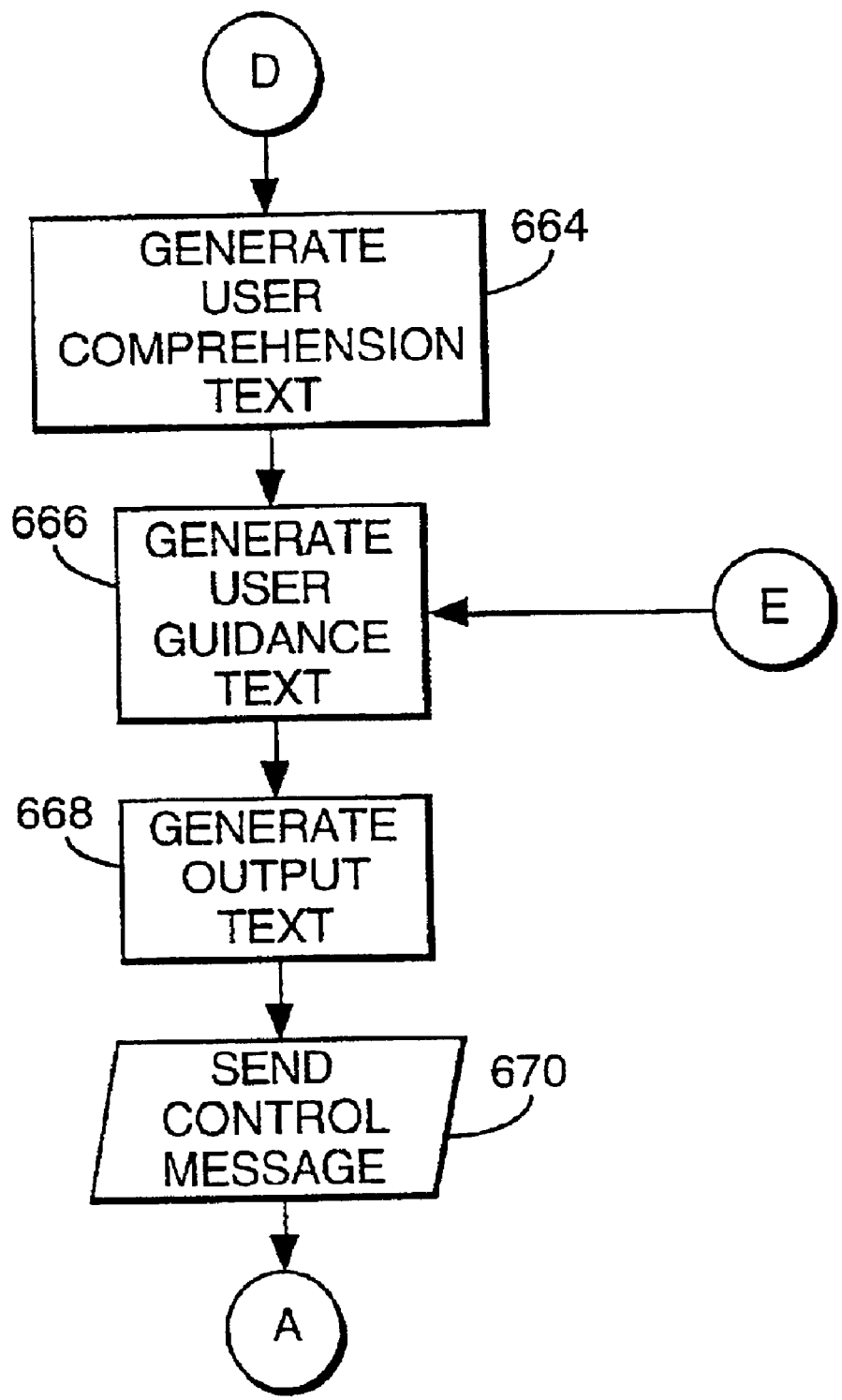

Referring to FIG. 9c, next, in step 624, each word is looked up in the word store 208 and each possible syntactic category for each word (e.g. noun, verb) is read out, to create for each word a list of alternative forms defining more branches in the lattice of words (step 626). The process is repeated (step 630) until the end of the input text is reached (step 628).

At this point, the processor 204 selects a first path through the lattice of words thus created and reads each of the rules in the rule store 210 in turn, and compares the word path with each set of rules.

On each comparison, if the relationships between the properties of the words present corresponds to the relationships specified in the rules, then the syntactic category associated with the rule in question is detected as being present, and a syntactic structure, corresponding to that syntactic category and the words which are detected as making it up, is stored.

The CPU 204 applies the correct form of each rule (e.g. 210a) which specifies the necessary agreements between all words making up the syntactic category of the rule, and then in succession the relaxed forms of the same rule. When one of the forms of the rule is met, the syntactic category which is the subject of the rule is deemed to be present, and a successful parse is recorded.

However, the CPU 204 additionally stores information on any error encountered, by referring to the identity of the relaxed rule which successfully parsed the text; if the rule relaxes the gender agreement criterion, for example, a gender agreement error is recorded as being present between the words which were not in agreement.

The parse may pass twice (or more times) through the input text, since some rules may accept as their input the syntactic structures generated in response to other rules (for example noun phrases and verb phrases).

If, after the parsing processing has concluded, it has been possible to parse the complete input text (step 636), the semantic structure thus derived is stored (step 636) and the next word path is selected (step 640) until all word paths through the word lattice have been parsed (step 641).

Next, in step 644, the CPU 204 reads the output response buffer 220, notes its previous output, and looks up the entry in the response table 214 associated with it. The response first read from the list is that considered most likely to correspond to the last output.

Next, the CPU 204 accesses, for that response, the corresponding entry in the syntactic category table 218 (again, the first entry selected corresponds to that most likely to be found).

Next, in step 646 the or each semantic structure derived above as a result of the parse of the input text is compared (steps 648–652) with the expected response syntactic category until a match is found.

The CPU 204 first reviews the parses performed by the strict forms of grammatical rules and, where a complete parse is stored based on the strict rules (i.e. with no errors recorded as being present) this is selected. Where no such parse exists, the CPU 204 then selects a comparison the or each parse including recorded errors, based on the relaxed forms of the rules.

At this point, in step 654, the CPU 204 ascertains whether the semantic structure contains an action which could be performed. For example, the semantic structure may correspond to:

a question which can be answered, or a request for a sale transaction which can be met, or an indication that a series of one or more sale transactions is now complete, in which case a price total can be calculated and indicated.

In the first of these cases, the input semantic structure needs to correspond to a question and needs to mention the type of item of which the price is being asked (in this embodiment price represents the only datum stored in relation to each transaction, but in general other properties could be questioned).

In the second case, the input statement needs to specify a kind of item to be sold and a quantity which is valid for that kind of goods (e.g. "apples" and "three kilos"). It may be phrased as a sentence in the target language ("I would like three kilos of apples") or as a question ("Could I have three kilos of apples?") or as a noun phrase ("Three kilos of apples").

In the last case, the input text could take a number of forms, ranging from a word to a sentence.

If the input text does not obviously correspond to any action would could be carried out, further comparisons are attempted (the CPU 204 returns to step 652) and if no possible action is ultimately determined, (or if one or more words are not recognized in step 612 above) then the CPU 204 determines that the input text cannot be understood (step 656).

If, on the other hand, all the information necessary to carry out an action (complete a purchase, answer a question etc.) is present then the CPU 204 selects that action for performance (step 658).

Finally, if it is possible to determine the nature of the action to be performed but not to perform it, then the CPU 204 formulates (step 660) a query to elucidate the missing information for the performance of the action.

For instance, if the input text is (in the target language) "I would like to buy some apples", the CPU 204 determines that the intended action is to purchase apples, accesses the record for apples in the transaction table 214; and notes that the quantity information is missing.

In each case, the CPU 204 is arranged to derive output text, user guidance text and an indication of suitable images for display, for transmission to the terminal 10.

Where unrecognized words have caused the missing text not to be understood, the CPU 204 generates user guidance text (step 666) indicating to the user the words which have not been understood and prompting the user for replacements. In step 668, output text (in the target language) is generated indicating that the grocer cannot understand the words concerned.

The same process is performed where (step 656) the input text was not understood for other reasons, except that the output text and user guidance texts refer to general misunderstanding rather than specific words.

Error Present

In the event that an action has been fully or partly possible, the semantic structure corresponding to the action to be undertaken (for example indicating that three kilograms of apples are to be sold, or that a question is to be asked requesting the quantity of apples) is stored in the output buffer 220.

In the event that an action has been fully or partly possible, then in step 662 the CPU 204 determines whether spelling or grammatical errors were entered. If so, then in step 664, the CPU 204 selects comprehension text consisting of one or both of the pre-stored target language phrases "Erreur d'orthographe!" or "Erreur de grammaire!") for transmission in the comprehension text field 508 and display in the comprehension text area 308.

At the same time, the CPU generates source language help text for transmission in the user guidance text field 514 and display in the user guidance area 314b. Where the error is a spelling mistake, the text comprises, in the source language, the words "What the tutor thinks you did wrong is . . . I think you made a spelling mistake, (stored input word) should be (word with which it was replaced in the successful parse)".

Where the error is a grammatical error, the CPU determines which rule failed to be met, and thereby determines whether the error was an error of gender or number, or an error of subject/verb agreement.

The text then generated is "What the tutor thinks you did wrong is . . . I think you made a grammatical mistake, try checking you have used the right (gender, number or verb form)".

Next, in step 666 the CPU 204 selects the text to be output for the user guidance text areas 314a and 314c. The text for the area 314a is obtained by looking up the stored last output in the buffer 220 and accessing the text stored in the corresponding record 216 for that output. This text describes the response selected in step 658 or the query formulated in step 660; for example, where the action of supply of goods has been successfully completed (step 658) the text in field 314a will read (in the source language) "What the shop keeper has just said is . . . The shop keeper has supplied your goods, and is waiting for you to give him a new instruction."

The text in the field 314c offers the user logical response options, and is obtained by looking up the text stored with the anticipated responses in the field within the table 216 which relates to the action or query just generated in step 658 or 660 and stored in the buffer 220.

Finally, in step 668, the output text field 506 to be sent in the message 500 and displayed in the output text area 306 is generated.

The generation could take the form of simple selections of corresponding text, as in the above described text generation stages, but it is preferred in this embodiment to generate the output text in a freer format, since this is likely to lead to greater variability of the responses experienced by the user and lower memory requirements.

To achieve this, the CPU 204 utilizes the rules stored in the rule table 210 and the words stored in the lexicon 208 to generate text from the high level response generated in steps 658 or 660. In general, the process is the reverse of the parsing process described above, but simpler since the process starts from a known and deterministic semantic structure rather than an unknown string of text.

Figure 9F:
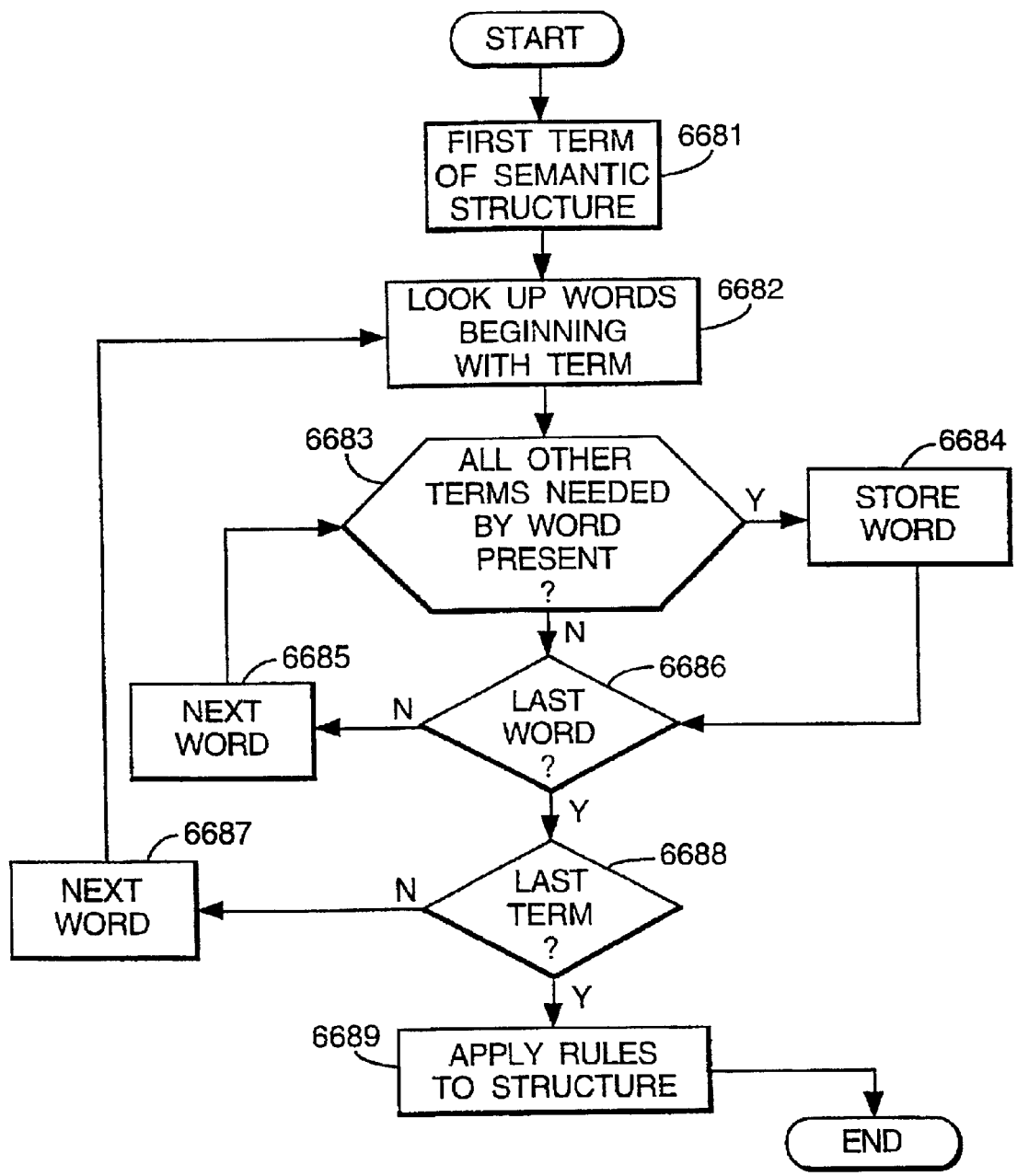

The first stage, as shown in FIG. 9f, is to select from the lexicon table 208 a subset of words which could be used in the output text. In a step 6681, the CPU 204 reviews the first term in the semantic structure generated in step 658 or 660. In a step 6682, the CPU 204 looks up, in the lexical table 208, each word the record of which begins with that term.

In step 6683, the CPU 204 compares the record for the word with the output semantic structure. If all other terms required by the word are present in the output semantic structure, then in step 6684 the word is stored for possible use in text generation; if not, the next word beginning with that term is selected (step 6685).

When the last word is reached (step 6686), the next term is selected (step 6687) and the process is repeated until the last term is reached (step 6688), at which point all words which could contribute to the generation of the output text have been stored.

Next, in step 6689, the CPU 204 accesses the rules table 210 and applies the rules relating to the stored terms of the output semantic structure to the words selected in the preceding steps to generate output text.

Thus, where the quantity of apples required is to be queried, the semantic structure includes a term specifying a query; a term specifying that the subject of the query is quantity; and a term specifying that the object of the query is that which an attempt was previously made to purchase; namely apples.

The words selected in steps 6681–6888 consist of the word for "apples" in the target language; and the query word or phrase which specifies quantity. Application of the rules for construction of a query then leads to the generation of a grammatically correctly worded question.

Returning to FIG. 9d, in step 670 the CPU 204 transmits the control message 500 formed by the above steps to the terminal 10. The CPU 204 then returns to step 610 of FIG. 9b to await the next received input text.

Other Embodiments and Modifications

In the foregoing, for clarity, the operations of the embodiment have been described in general terms, without specifying in detail the steps which are performed by separate programme components. In a convenient implementation, however, the applet program would control all image displaying operations, and image data would be supplied by the server program on the host computer 20, rather than by the application program performing the semantic processing.

In the foregoing embodiments, conveniently, the semantic processing performed on the host processor 20 may be written in the Prolog language, and the parsing may be performed by Prolog backtracking.

It will, however, be recognized that the invention could be implemented using any convenient hardware and/or software techniques other than those described above.

Equally, while a language training program has been described, it will be recognized that the invention is applicable to other types of training in which it is desired to emulate the interaction of a user with another person.

Further, it will be apparent that the terminal 10 and computer 20 could be located in different jurisdictions, or that parts of the invention could further be separated into different jurisdictions connected by appropriate communication means. Accordingly, the present invention extends to any and all inventive subcomponents and subcombinations of the above described embodiments located within the jurisdiction hereof.

In the above described embodiments, text input and output have been described. However, in a further embodiment, the terminal 10 may be arranged to accept input speech via a microphone and transmit the speech as a sound file to the computer 10, which is correspondingly arranged to apply a speech recognition algorithm to determine the words present in the input.

Together, or separately, the output text generated by the grocer may be synthesised speech, and accordingly in this embodiment the computer 10 comprises a text to speech synthesizer arranged to generate a sound file transmitted to the terminal 10. In either such case, a suitable browser program other than the above described Netscape (TM) browser is employed.

Other forms of input and output (for example, handwriting recognition input) could equally be used.

Although in the preceding embodiments the redisplay of the head portion of the grocer image has been described, it will be apparent that it may be more convenient simply to redisplay the entire image of the grocer in other embodiments.

It will be apparent that the transactions described above need not be those of a grocer shop. The scenario could, for example, involve a clothes shop (in which case the articles sold would comprise items of clothing) or a butcher's shop (in which the case the items sold would comprise cuts of meat). Equally, other forms of training than foreign language training could be involved, in which case the scenarios could involve familiarity in the source language with scenarios such as emergency or military procedures.

Accordingly, the invention is not limited by the above described embodiments but extends to any and all such modifications and alternatives which are apparent to the skilled reader hereof.

What is claimed is:

1. Training apparatus for training a user to engage in transactions with another person whom the apparatus is arranged to simulate, the apparatus comprising:

an output device for outputting of messages to a user;

an input for receiving input from the user;

a lexical store containing data relating to individual words of said input;

a rule store containing rules specifying grammatically allowable relationships between words of said input;

a transaction store containing data relating to allowable transactions between said user and said person, said data defining, for said output messages, types of allowable inputs from said user;

an output message buffer for storing data representative of the most recent message output by the output device and at least a preceding one of said messages output from the output device;

a processor having at least read access to the lexical store and the rule store, said processor being arranged to process the input by comparing the input with the words contained in said lexical store and with the relationships specified by the rules contained in said rule store, in order to recognize the occurrence in the input of words contained in said lexical store and in the relationships specified by the rules contained in said rule store, and, in dependence upon said recognition, to generate output indicating when correct input has been recognized; and wherein said processor is further responsive to the data contained in the message buffer and the transaction store to;

(a) determine whether said input is an allowable response to a most recent one of the output messages represented by data stored in the output message buffer; and (b) if said input is not determined to be an allowable response to a most recent one of the messages, determine whether said input is an allowable response to a preceding message represented by data stored in the output message buffer;

an output device for making the output available to the user so that said user can be trained to engage in transactions with another person.

2. Apparatus according to claim 1, in which the processor is arranged to generate output responsive to input, and to detect recognized errors in said input, and, on detection thereof, to indicate said recognized errors separately of said responsive output.

3. Apparatus according to claim 1 which is arranged to provide language training, in which said rules, said words, and said output are in a training target language, and further arranged to generate user guidance in a source language for said user and different to said target language.

4. Apparatus according to claim 3 in which the user guidance comprises guidance as to the meaning of the output.

5. Apparatus according to claim 3 in which the user guidance comprises an explanation of any detected errors in the input.

6. Apparatus according to claim 3 in which the user guidance indicates suitable further input which could be provided.

7. Apparatus according to claim 3, in which said user interface comprises a display to display said output and user guidance is normally not displayed on said display, and further comprising an input device via which a user may selectively cause the display of said user guidance on said display.

8. Apparatus according to claim 1 in which said input and/or said output comprise text.

9. Apparatus according to claim 1, in which said input comprises speech, and further comprising a speech recognizer arranged to recognize the words of said speech.

10. Apparatus according to claim 1 in which said output comprises speech, said apparatus further comprising a speech synthesizer.

11. Apparatus according to claim 1, further comprising a user interface arranged to accept said input and make available said output to the user.

12. Apparatus according to claim 11, in which said user interface comprises a display and in which said output is displayed on said display.

13. Apparatus according to claim 11, in which said user interface is located remotely from said processor and is coupled thereto via a communications channel.

14. Apparatus according to claim 1, further comprising an inflection store operatively coupled to said lexical store.

15. Apparatus according to claim 14, wherein each record in said lexical store contains a pointer to one of records in said inflection store.

16. Apparatus according to claim 14, wherein the number of records in the inflection store is smaller than the number of records in the lexical store.

17. Training apparatus for training a user to engage in transactions with another person whom the apparatus is arranged to simulate, the apparatus comprising:

an input for receiving input dialogue from a user;

a lexical store containing data relating to individual words of said input dialogue;

a rule store containing rules specifying grammatically allowable relationships between words of said input dialogue;

a transaction store containing data relating to allowable transactions between said user and said person;

a processor having at least read access to the lexical store, the rule store and the transaction store, said processor being arranged to process the input dialogue by comparing the input dialogue with the words contained in said lexical store, with the relationships specified by the rules contained in said rule store, and with the data specified in the transaction store, in order to recognize the occurrence in the input dialogue of words contained in said lexical store, in the relationships specified by the rules contained in said rule store, in accordance with the data specified in the transaction store, and, in dependence upon said recognition, to generate output dialogue indicating when correct input dialogue has been recognized; and an output device for making the output dialogue available to the user so that said user can be trained to engage in transactions with another person;

wherein said rule store contains first rules comprising criteria specifying correct relationships between words of said lexical store, and, associated with said first rules, one or more second rules each corresponding to one of said first rules but with one relationship criterion relaxed, said processor processing said input dialogue using both said first rules and second rules.

18. Apparatus according to claim 17, wherein said relationship criteria correspond to agreements between words.

19. Apparatus according to claim 18, wherein said agreements between words comprises agreements of gender or agreements of number.

20. Apparatus according to claim 17, in which said processor is arranged to detect said recognized errors on detection of input dialogue containing words which meet said second, but not said first, rules.

21. An interactive dialogue apparatus for simulating dialogue with a user, the apparatus comprising:

an output device for outputting messages to the user;

an input device for receiving input from the user in response to a message output from the output device in order to simulate dialogue;

a lexical store for storing data relating to individual words;

a rule store for storing rules specifying grammatically allowable relationships between words of said input;

a processor for processing said input to recognize occurrence in the input of words stored in said lexical store and in the relationships specified by the rules stored in said rule store;

an output message buffer for storing data representative of a plurality of messages output to said user; and a transaction store for storing data defining, for each of said messages, a type of allowable response;

said processor being responsive to an input from said user, to the data stored in the output message buffer and to the data stored in the transaction store to;

(a) determine whether said input is an allowable response to a most recent one of the messages represented by data stored in the output message buffer; and (b) if said input is determined not to be an allowable response to a most recent one of the messages, determine whether said input is an allowable response to another one of the messages represented by data stored in the output message buffer.

22. Apparatus according to claim 21, wherein the processor is arranged to generate output responsive to input, and to detect recognized errors in said input, and, on detection thereof, to indicate said recognized errors separately of said responsive output.

23. Apparatus according to claim 21, said apparatus being arranged to provide language training, in which said rules, said words, and said output are in a training target language, and further being arranged to generate user guidance in a source language for said user and different to said target language.

24. An interactive dialogue apparatus for simulating dialogue with a user, the apparatus comprising:

an output device for outputting messages to the user;

an input device for receiving input from the user;

a lexical store for storing data relating to individual words;

a rule store for storing rules specifying grammatically allowable relationships between words of said input;

a processor for processing said input to recognize occurrence in the input of words stored in said lexical store and in the relationships specified by the rules stored in said rule store;

an output message buffer for storing data representative of a plurality of messages output to said user; and a transaction store for storing data defining, for each of said messages, a type of allowable response;

said processor being responsive to an input from said user, to the data stored in the output message buffer and to the data stored in the transaction store to;

(a) determine whether said input is an allowable response to a most recent one of the messages represented by data stored in the output message buffer; and (b) if said input is determined not to be an allowable response to a most recent one of the messages, determine whether said input is an allowable response to another one of the messages represented by data stored in the output message buffer;

wherein said rule store stores first rules comprising criteria specifying correct relationships between words of said lexical store, and, associated with said first rules, one or more second rules each corresponding to one of said first rules but with one relationship criterion relaxed, said processor processing said input using both said first rules and second rules.

25. A method of operating an interactive dialogue apparatus for simulating dialogue with a user, the method comprising:

outputting messages to the user;

receiving input from the user in response to a message output to the user in order to simulate dialogue;

storing data relating to individual words;

storing rules specifying grammatically allowable relationships between words of the input;

processing said input to recognize occurrence in the input of words related to stored data and relationships specified by the stored rules;

storing message data representative of a plurality of messages output to the user; and storing data defining, for each of the output messages, a type of allowable response;

determining whether an input is an allowable response to a most recent one of the stored messages represented by stored message data; and if the input is not determined to be an allowable response to a most recent one of the messages, determining whether the input is an allowable response to another stored message represented by stored message data.

26. An interactive dialogue apparatus for simulating dialogue with a user, the apparatus comprising:

an output device for outputting messages to the user;

an input device for receiving input from the user in response to a message output from the output device in order to simulate dialogue;

a processor for processing said input;

an output message buffer for storing a plurality of messages output to the user; and a transaction store for storing a type of allowable response for each of the messages output to the user;

wherein the processor determines whether the input is an allowable response to a most recent one of the messages output to the user, and if not, determining whether the input is an allowable response to a previous one of the messages output to the user.

27. Training apparatus for training a user to engage in transactions with another person whom the apparatus is arranged to simulate, the apparatus comprising:

an output device for outputting of messages to a user;

an input for receiving input from the user;

a lexical store containing data relating to individual words of said input;

a rule store containing rules specifying grammatically allowable relationships between words of said input;

a transaction store containing data relating to allowable transactions between said user and said person, said data defining, for said output messages, types of allowable inputs from said user;

an output message buffer for storing data representative of the most recent message output by the output device and at least a preceding one of said messages output from the output device;

a processor having at least read access to the lexical store and the rule store, said processor being arranged to process the input by comparing the input with the words contained in said lexical store and with the relationships specified by the rules contained in said rule store, in order to recognize the occurrence in the input of words contained in said lexical store and in the relationships specified by the rules contained in said rule store, and, in dependence upon said recognition, to generate output indicating when correct input has been recognized; and wherein said processor is further responsive to the data contained in the message buffer and the transaction store to;

(a) determine whether said input is an allowable response to a most recent one of the output messages represented by data stored in the output message buffer; and (b) if said input is not determined to be an allowable response to a most recent one of the messages, determine whether said input is an allowable response to a preceding message represented by data stored in the output message buffer; and an output device for making the output available to the user so that said user can be trained to engage in transactions with another person;

wherein said rule store stores first rules comprising criteria specifying correct relationships between words of said lexical store, and, associated with said first rules, one or more second rules each corresponding to one of said first rules but with one relationship criterion relaxed, said processor processing said input using both said first rules and second rules.

28. A dialogue training apparatus for training a user to engage in dialogue transactions with another person whom the apparatus is arranged to simulate, the apparatus comprising:

an output device for outputting of messages to a user;

an input for receiving input from the user;

a lexical store containing data relating to individual words of said input;

a rule store containing rules specifying grammatically allowable relationships between words of said input;

a transaction store containing data relating to allowable transactions between said user and said person, said data defining, for said output messages, types of allowable inputs from said user;

an output message buffer for storing data representative of the most recent message output by the output device and at least a preceding one of said messages output from the output device;

a processor having at least read access to the lexical store and the rule store, said processor being arranged to process the input by comparing the input with the words contained in said lexical store and with the relationships specified by the rules contained in said rule store, in order to recognize the occurrence in the input of words contained in said lexical store and in the relationships specified by the rules contained in said rule store, and, in dependence upon said recognition, to generate output indicating when correct input has been recognized; and wherein said processor is further responsive to the data contained in the message buffer and the transaction store to;

(a) determine whether said input is an allowable response to a most recent one of the output messages represented by data stored in the output message buffer; and (b) if said input is not determined to be an allowable response to a most recent one of the messages, determine whether said input is an allowable response to a preceding message represented by data stored in the output message buffer;

an output device for making the output available to the user for training the user to engage in dialogue transactions with another person.

* * * * *